US008413530B2

(12) United States Patent
Roby et al.

(10) Patent No.: US 8,413,530 B2

(45) Date of Patent: Apr. 9, 2013

(54) USE OF BUOYANT GASES FOR THE SIMULATION OF REAL FIRE SOURCES

(75) Inventors: Richard J. Roby, Columbia, MD (US); Douglas J. Carpenter, Pasadena, MD (US)

(73) Assignee: Combustion Science & Engineering, Inc., Columbia, MD (US)

(*) Notice: Subject to any disclaimer, the term of this patent is extended or adjusted under 35 U.S.C. 154(b) by 547 days.

(21) Appl. No.: 12/778,060

(22) Filed: May 11, 2010

(65) Prior Publication Data

US 2010/0282327 A1 Nov. 11, 2010

Related U.S. Application Data

(60) Provisional application No. 61/177,041, filed on May 11, 2009.

(51) Int. Cl.
*G01M 99/00* (2011.01)
*G08B 9/00* (2006.01)

(52) U.S. Cl. .......................... 73/866.4; 73/861; 73/865.9

(58) Field of Classification Search .................... 73/861, 73/865.6, 865.9, 866.4; 137/1; 251/129.01
See application file for complete search history.

(56) References Cited

U.S. PATENT DOCUMENTS

| | | | | |
|---|---|---|---|---|
| 4,861,270 | A | 8/1989 | Ernst et al. | |
| 4,983,124 | A | 1/1991 | Ernst et al. | |
| 4,994,092 | A * | 2/1991 | Eklund et al. | 44/629 |
| 5,168,544 | A * | 12/1992 | Kolasa | 392/396 |
| 5,233,869 | A | 8/1993 | Rogers et al. | |
| 5,266,033 | A | 11/1993 | Rogers et al. | |
| 5,320,536 | A | 6/1994 | Rogers et al. | |
| 5,328,375 | A | 7/1994 | Rogers et al. | |
| 5,335,559 | A | 8/1994 | Rogers et al. | |
| 5,345,830 | A | 9/1994 | Rogers et al. | |
| 5,967,027 | A | 10/1999 | Higashimoto | |
| 7,529,472 | B2 | 5/2009 | Lazzarini et al. | |
| 7,967,690 | B2 * | 6/2011 | O'Neill | 472/65 |
| 2003/0179095 | A1 * | 9/2003 | Opitz | 340/578 |
| 2003/0198922 | A1 * | 10/2003 | Musto et al. | 434/226 |
| 2007/0145069 | A1 | 6/2007 | Lazzarini et al. | |
| 2011/0112660 | A1 * | 5/2011 | Bergmann et al. | 700/29 |

(Continued)

FOREIGN PATENT DOCUMENTS

| | | |
|---|---|---|
| JP | 6-070732 | 9/1994 |
| KR | 10-0865028 | 10/2008 |

OTHER PUBLICATIONS

International Search Report issued in PCT/US2010/034444, mail Jan. 25, 2011.
Written Opinion issued in PCT/US2010/034444, mail Jan. 25, 2011.

(Continued)

*Primary Examiner* — Thomas P Noland
(74) *Attorney, Agent, or Firm* — DLA Piper LLP US

(57) ABSTRACT

A method and apparatus to simulate a flow of products from a real fire without reproducing a thermal environment associated with the real fire includes the release of a gas or a mixture of gases with an appropriate density less than air to simulate smoke movement from real fire sources. The buoyant inert gas may be helium. In some embodiments, the buoyant gas is combined with artificial smoke, such as a tracer gas or an inert dye (e.g., a particulate) to provide a visual representation of the location and flow characteristics of the surrogate smoke that is released from a release apparatus. In another embodiment, optical techniques that show differences in gas density are used to visualize the movement of the buoyant gas. The release apparatus includes a control system that follows a prescribed time-dependent flow rate to simulate different fire source configurations and growth rates.

20 Claims, 4 Drawing Sheets

OTHER PUBLICATIONS

English language abstract of JP 6-070732, published Sep. 7, 1994.

English language abstract of KR 10-0865028, published Oct. 23, 2008.

Smoke Management Systems in Malls, Atria, and Large Spaces, National Fire Protection Association, 2009 Edition, NFPA 92B.

* cited by examiner

USE OF BUOYANT GASES FOR THE SIMULATION OF REAL FIRE SOURCES

This application claims priority from U.S. Provisional Application Ser. No. 61/177,041 filed May 11, 2009. The entirety of that provisional application is incorporated herein by reference.

BACKGROUND

Currently in the field of fire safety, there is a need to test the ability of building smoke managements systems to function as designed. Since it is not practical to tests these systems with a large fire source, another method for testing such systems is desirable. Currently, smoke bombs or other similar smoke generation devices are used to test smoke management systems, but these techniques suffer from lack of realism in that it is difficult to accurately recreate the buoyancy forces that drive actual smoke movement in a real fire without generating significant energy release within the interior of a building that may cause damage or destruction of the surroundings.

DETAILED DESCRIPTION

Figure 1:
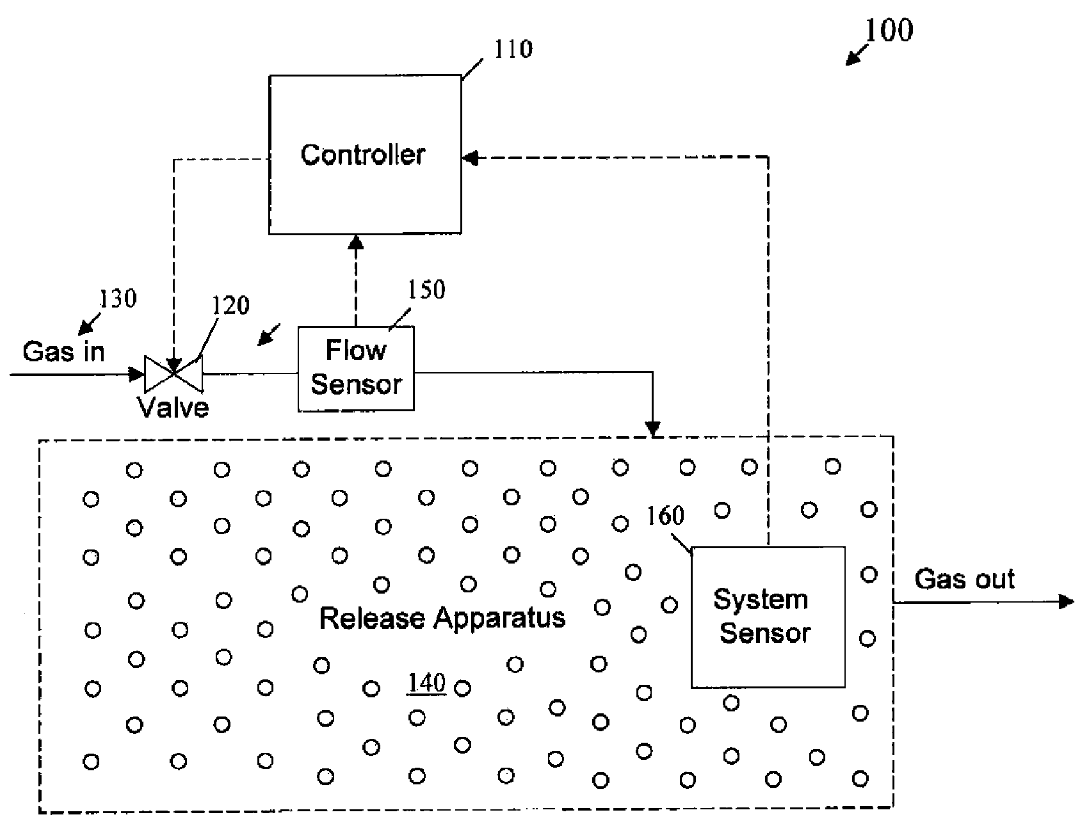
FIG. 1 is a schematic diagram of a system for the controlled release of inert buoyant gases according to one embodiment.
Figure 2:
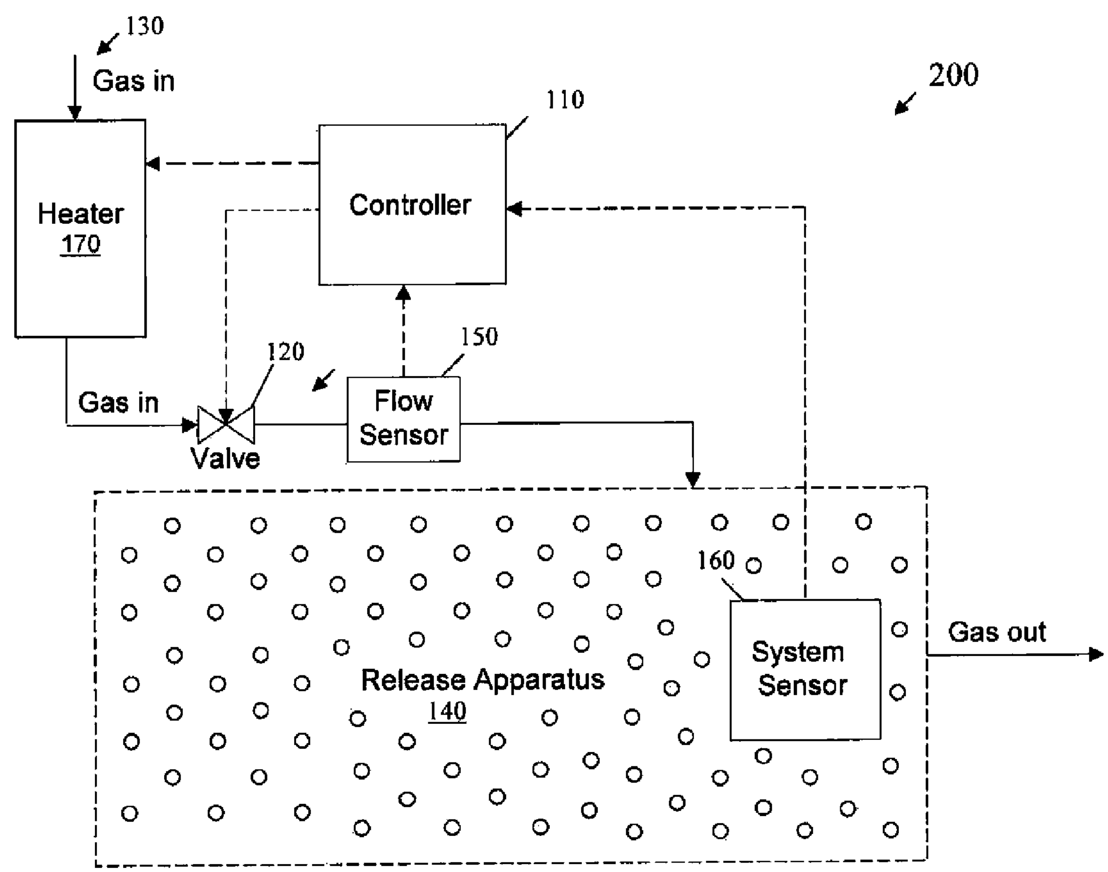
FIG. 2 is a schematic diagram of a system for the controlled release of inert buoyant gases according to a second embodiment.

In the following detailed description, a plurality of specific details, such as types of buoyant gases and configurations of release apparatuses, are set forth in order to provide a thorough understanding of the preferred embodiments discussed below. The details discussed in connection with the preferred embodiments should not be understood to limit the present inventions. Furthermore, for ease of understanding, certain method steps are delineated as separate steps; however, these steps should not be construed as necessarily distinct nor order dependent in their performance.

An alternative way to create appropriate buoyancy forces without significant energy release for simulating smoke movement from real fire sources is to release a gas or a mixture of gases with a density less than that of ambient air to simulate smoke movement from real fire sources. The gas may be inert and may be naturally buoyant with respect to ambient air ("naturally buoyant" should be understood to mean that the gas is inherently buoyant with regard to ambient air). In one embodiment, the naturally inert buoyant gas is helium or a gas mixture comprised of at least 50% helium, or greater than 75% helium, or greater than 90% helium, or greater than 95% helium.

An application of the invention is the testing of smoke management systems. However, it should be understood that the method and apparatus may be used whenever a need exists to simulate a flow of products from a real fire without reproducing a thermal environment associated with the real fire.

In some embodiments, the buoyant gas is combined with artificial smoke, such as a tracer gas (e.g. sulfur hexafluoride) or an inert dye (e.g., a particulate), to provide a visual representation of the location and flow characteristics of the surrogate smoke that is released from an apparatus. In other embodiments, optical techniques that show differences in gas density are used to visualize the movement of the buoyant gas. For example, an optical device that shows differences in gas density is used to provide a visual representation of the movement of the buoyant gas that is released from the apparatus. In some embodiments, the released inert gas may be illuminated with a monochromatic or polychromatic collimated light source and visualized using a schlieren or shadowgraph system.

The method and apparatus may include a means to simulate different fire source configurations and fire growth rates through a control system that follows a prescribed time-dependent flow rate.

Since there is a relationship between the geometry and size of the fire and the resulting characteristics and conditions of the flow produced, the method and apparatus in some embodiments includes the ability to change the configuration and the area over which the buoyant inert gas is released and the pressure at which the gas is released. Controlling the flow and area of release of the buoyant inert gas allows the growth rate of the fire to be simulated using this method and apparatus. The growth rate of the simulated fire can reproduce the growth rate of a specific fuel and configuration or a generic growth rate such as a "t-squared" (i.e. $\dot{Q}=\alpha t^2$, where $\dot{Q}$ is the heat release rate, $\alpha$ is the growth rate constant, and t is the time) fire. The vertical height at which the inert buoyant gas is released can also be varied to create an equivalent source, but reduce the required flow of gas due to a lower rate of entrainment of air into the buoyant flow when compared to the rate of entrainment of air at lower vertical heights. The system pressure utilized ranges from the pressure required to overcome the hydraulic losses in the piping system of the release apparatus to pressures consistent with producing a Froude number (Fr) where the flow within a couple of diameters of the nozzle or other release orifice would simulate a buoyancy-driven fire source as opposed to a momentum-driven fire source. The use of a buoyant inert gas provides a practical means for use in applications where there is a low tolerance for the effects of relatively high temperature flow and surface deposition of products of combustion from actual fire sources.

As discussed above, a mixture of gases is used in some embodiments. Using a mixture of gases provides a mechanism for more precise control of the buoyancy of the gas than would be possible using a single gas such as helium alone. In other embodiments, the gas is heated to control the buoyancy. Still other embodiments may employ both mixtures of gases and heating of the mixed gases to control the buoyancy. Furthermore, in addition to using mixtures of gases for the purpose of fine tuning a desired buoyancy, a tracer gas may also be mixed with the buoyant gas for visualization purposes.

An application of the invention is the testing of smoke management systems. Smoke management systems are engineered systems that include all methods that can be employed to control smoke movement. Smoke management systems associated with unwanted fires in buildings are designed to maintain a tenable environment within all exit passages and areas of refuge access paths for the time necessary to allow occupants to safely reach an exit or area of refuge. In addition to building occupants, the benefits of smoke management are for fire fighters and for the reduction of property damage. Methods of smoke management include mechanisms of compartmentation, dilution, pressurization, airflow, and buoyancy. These are used by themselves or in combination to manage smoke conditions in fire situations.

Standards associated with the design and installations of smoke management systems require acceptance testing to measure the ability of the installed system to meet specific performance design criteria. Historically, acceptance testing of smoke management systems has utilized a range of fire/smoke sources that range from "smoke bombs" to real fire sources. The use of artificial smoke generated from "smoke bombs" is not a realistic surrogate due to its inability to produce the same buoyant pressure differences as the products of combustion from real fire sources. The use of real fire sources in acceptance testing has obvious safety and property protection issues that make their use unsafe and impractical. Thus, these significant limitations do not allow for all of the specific performance design criteria to be tested.

A schematic diagram of a system 100 according to one embodiment of the invention is shown in FIG. 1. The system includes a controller 110 connected to control a valve 120 actuated by the controller 110 that controls the flow of the inert buoyant gas from a source 130 to a release apparatus 140 which, in this embodiment, comprises a plenum having a plurality of ports formed therein. A flow sensor 150 is connected between the valve 120 and the release apparatus 140 to measure the flow of the buoyant gas into the release apparatus and provide an input indicative of the volume of this flow to the controller 110. The controller 110 uses this input to control the valve 120. A system sensor 160 measures one or more characteristics of the plume being generated by the release apparatus 140. Although the system sensor 160 is illustrated inside the release apparatus 140 in FIG. 1, it should be understood that the system sensor 160 may also be placed outside the release apparatus 140 in other embodiments. In yet other embodiments multiple system sensors 160 are provided at different spatial locations (e.g., different heights. In some embodiments, the system sensor 160 measures the velocity and temperature of the gas plume. This information is fed back to the controller 110 and is used in the control algorithm of the controller 110 along with the output of the flow sensor 150 for control of the valve 120. The use of the system sensor 160 together with the flow sensor 150 enhances the ability of the controller 110 to accurately simulate a real fire plume with the system of FIG. 1. In other embodiments, only a flow sensor 150 or only a system sensor 160 is utilized.

A schematic diagram of a system 200 according to a second embodiment is shown in FIG. 1. The system 200 is similar to the system 100, but includes a heater 170 that is configured to heat the gas from the supply 130 under control of the controller 110. The heater 170 provides for an additional degree of control by the controller 110. Those of skill in the art will recognize that, in embodiments in which the buoyant gas is comprised of a mixture of gases, the heater 170 may heat only one of the components, or separate heaters 170 may be provided for each component.

In some embodiments, the release apparatus 140 includes a series of pipes and nozzles arranged in a manner that simulates a "2-D" fire (e.g. liquid pool fire) in a square, circular, or other configuration. An example of an embodiment with a circular configuration is the system 300 illustrated in FIG. 3. The system 300 includes a controller 110 connected to control a valve 120 actuated by the controller 110 that controls the flow of the inert buoyant gas from a source 130 to a bank of control valves 380. The use of multiple control valves provides for increased precision in the control of the release of the buoyant gas than would be possible with a single valve as in the embodiment of FIG. 1. A flow sensor 150 is connected between the valve 120 and the control valve bank 380 to measure the flow of the buoyant gas into the release apparatus 340 and provide an input indicative of the volume of this flow to the controller 110. The controller 110 uses this input to control the valve 120. The valve bank 380 actuated by controller 110 controls the flow of the inert buoyant gas to the sections of the release apparatus 340, which is in the form of a series of concentric circular pipes 342 each having a plurality of ports 344 (e.g., simple orifices, or fixed or adjustable nozzles) formed therein. A flow sensor bank 390 is connected between the grid valve bank 380 and the release apparatus 340 to measure the flow of buoyant gas into the release apparatus and provide input indicative of the volume of this flow to the controller 110. The controller 110 uses this input to control the control valve bank 180, with each of the valves in the bank 380 controlling the flow to an individual pipe 342 in the release apparatus 340. A system sensor 160 measures one or more characteristics of the plume being generated by the release apparatus 340. The system sensor 160 is positioned above the release apparatus 340 in FIG. 3. In some embodiments, the system sensor 160 measures the velocity and temperature of the gas plume. This information is fed back to the controller 110 and is used in the control algorithm of the controller 110 along with the output of the flow sensor 150 for control of the valve 120. The use of the system sensor 160 together with the flow sensor 150 and the sensors 390 enhances the ability of the controller 110 to accurately simulate a real fire plume with the system of FIG. 3. In other embodiments, not all of these sensors are utilized.

Figure 3:
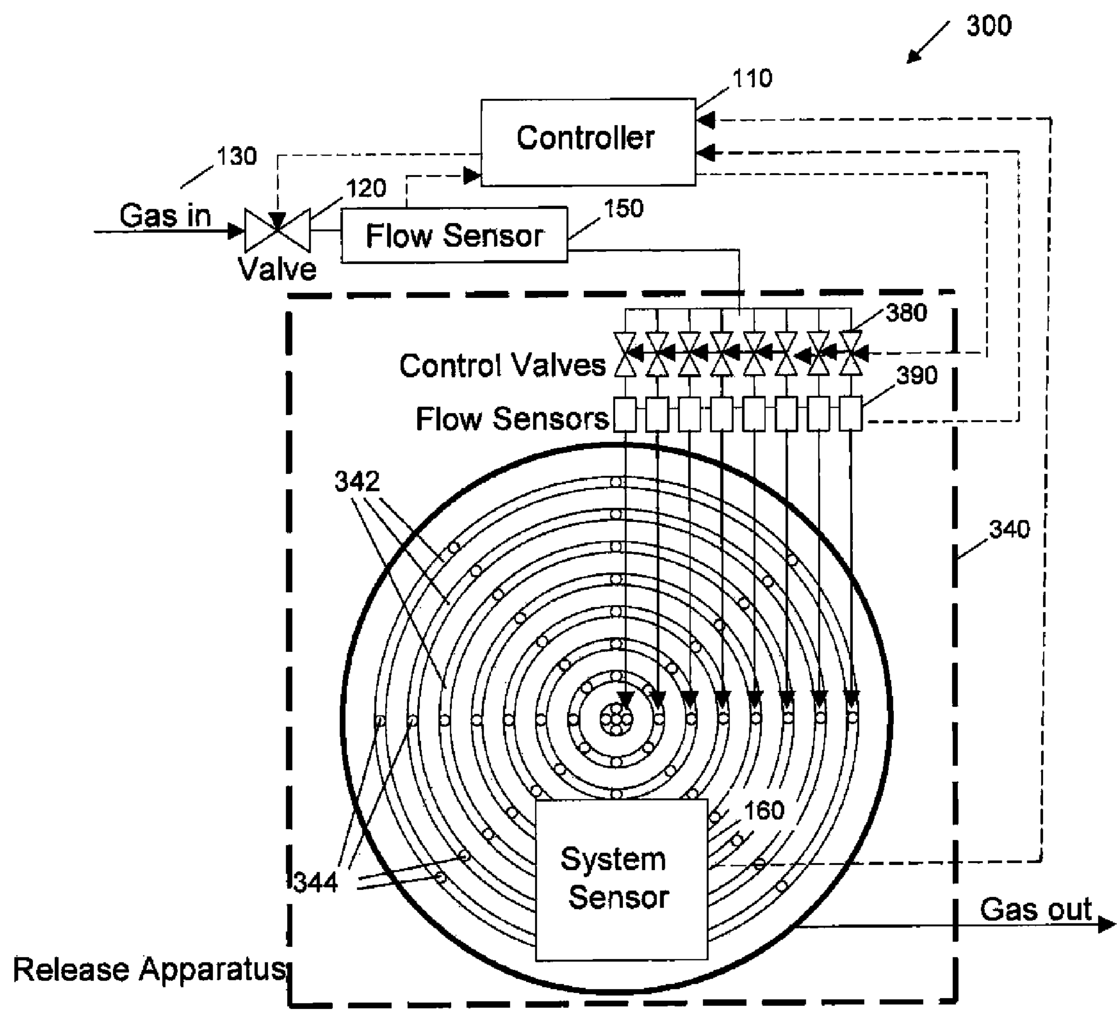
FIG. 3 is a schematic diagram of a system for the controlled release of inert buoyant gases with a circular release apparatus according to a third embodiment.
Figure 4:
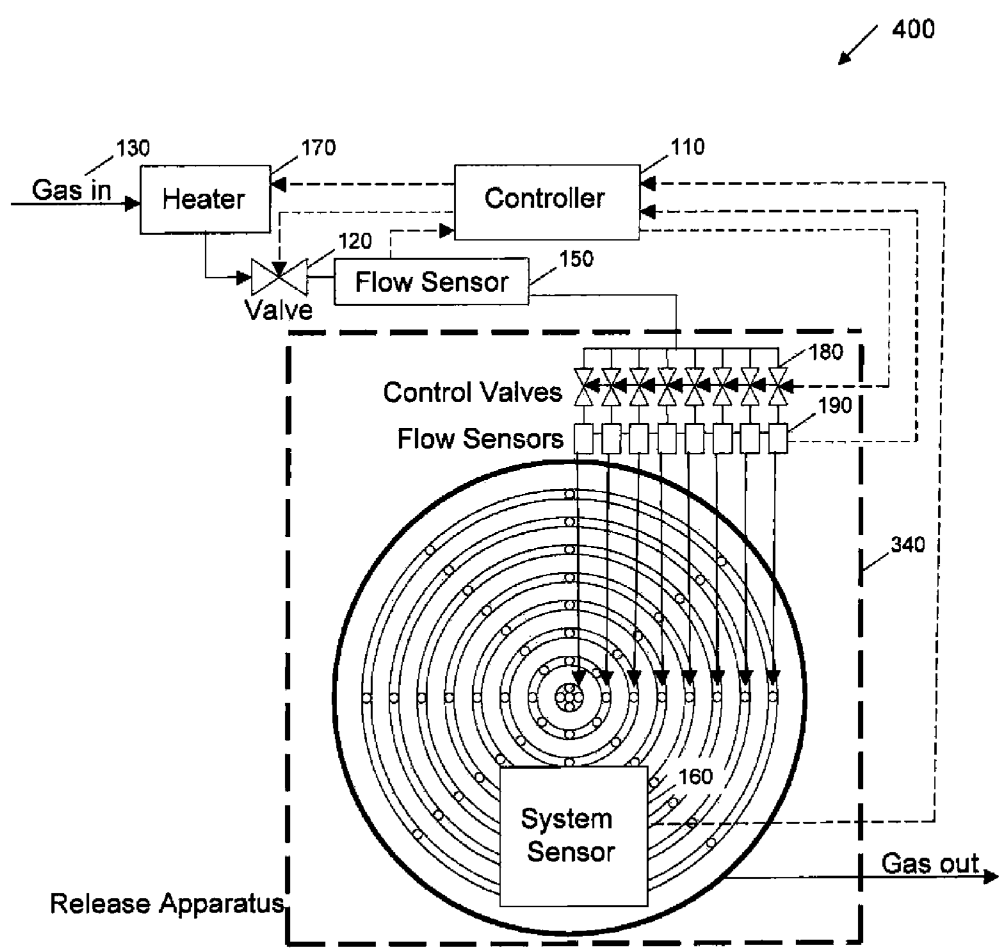
FIG. 4 is a schematic diagram of a system for the controlled release of inert buoyant gases with a circular release apparatus according to a fourth embodiment.

FIG. 4 illustrates a system 400 that is similar to the system 300 of FIG. 3, but further includes a heater 170 for the buoyant gas source 130. As discussed, multiple heaters 170 may be used where a plurality of gas sources are utilized, or a single heater may be used for one or more of the plurality of gas sources.

In yet other embodiments, the release apparatus simulates "3-D" fires through a cube, pyramid, or other volumetric configuration. Each configuration is preferably made up of similar and smaller sections that allow the size of the apparatus to be changed as the maximum size of the simulated fire may change among applications (i.e. the area from which the simulant gas is released does matter). The growth rate of the simulated fire can also be controlled by flow to individual sections or variable flow through each nozzle or each group of nozzles inside the release apparatus (in such embodiments, there are also multiple valves 120, one for each nozzle or one for each group of nozzles, inside the release apparatus). There are also multiple system sensors 160 in some embodiments.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. A method for simulating the flow of smoke from a real fire source comprising the steps of:

determining a velocity profile of smoke corresponding to the real fire source; and controlling the release of pressurized buoyant gas from a release apparatus such that the velocity profile of the buoyant gas is substantially the same as the velocity profile of the real fire source, whereby the buoyant gas serves as a surrogate for a flow of the products of combustion from real fire sources.

2. The method of claim 1, further comprising the step of varying the configuration of the release apparatus while the buoyant gas is being released to change the geometry of the simulated fire source.

3. The method of claim 2 further comprising the steps of controlling the rate of flow of the buoyant gas and controlling the surface area over which the inert buoyant gas is released.

4. The method of claim 1, wherein the releasing step is performed using an input from a sensing system configured to measure the flow rate of buoyant gas outside the release apparatus.

5. The method of claim 1 in which the releasing step is performed using a control system configured to control the flow of buoyant gas.

6. The method of claim 5, wherein the controller generates a flow level control signal.

7. The method of claim 5, wherein the controller receives a signal from a sensing system associated with the release apparatus.

8. The method of claim 5, wherein the controller is an analog controller that generates a control output from an input signal through the use of tuned control coefficients.

9. The method of claim 8, wherein the analog controller is a PID (proportional, integral, differential) controller.

10. The method of claim 5, wherein the controller is a digital controller that calculates a flow of buoyant gases required to maintain a predefined flow rate.

11. The method of claim 5, wherein the controller releases the buoyant gas to simulate a t-squared fire.

12. The method of claim 1, further comprising the step of varying the vertical height of the release apparatus to reduce the buoyant gas required due to entrainment of air in the flow of gas for an equivalent source at a lower vertical height.

13. The method of claim 1, wherein the buoyant gas is released inside a structure with a smoke handling system, and further comprising the step of monitoring the flow of smoke into the smoke handling system.

14. The method of claim 13, wherein the buoyant gas includes a visible tracer gas and wherein the monitoring step is performed by a human being who visually observes the visible tracer gas.

15. The method of claim 1, wherein the buoyant gas is inert.

16. The method of claim 1, wherein the buoyant gas is naturally buoyant.

17. The method of claim 1, further comprising the step providing a visual representation of the movement of the buoyant gas that is released from the apparatus using an optical device that shows differences in gas density.

18. A system for simulating the flow of smoke from a real fire source comprising:

an electrically controllable valve having a first port connectable to a pressurized supply of buoyant gas and a second port;

a controller connected to control the valve;

a flow sensor with an inlet connected to the second port of the valve and an outlet and a measurement output connected to the controller; and a release apparatus connected to the outlet of the flow sensor;

wherein the controller is configured to control the valve as a function of the measurement output of the flow sensor to release the buoyant gas with a profile of smoke corresponding to a desired real fire source.

19. The system of claim 18, further comprising a system sensor configured to measure a characteristic of the buoyant gas released from the release apparatus and connected to transmit an indicator of the characteristic to the controller, wherein the controller further controls the valve as a function of the indicator.

20. The system of claim 18, further comprising a heater configured to heat the pressurized gas from the gas supply and connected to the controller.

* * * * *